United States Patent
Ninomiya

(10) Patent No.: US 10,379,313 B2
(45) Date of Patent: Aug. 13, 2019

(54) VIBRATION WAVE MOTOR AND LENS DRIVING APPARATUS

(71) Applicant: CANON KABUSHIKI KAISHA, Tokyo (JP)

(72) Inventor: Shunsuke Ninomiya, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/623,708

(22) Filed: Jun. 15, 2017

(65) Prior Publication Data

US 2017/0371125 A1 Dec. 28, 2017

(30) Foreign Application Priority Data

Jun. 23, 2016 (JP) ................. 2016-124267

(51) Int. Cl.
| | |
|---|---|
| *G02B 7/02* | (2006.01) |
| *G02B 15/14* | (2006.01) |
| *H01L 41/00* | (2013.01) |
| *B06B 1/06* | (2006.01) |
| *H02N 2/00* | (2006.01) |
| *H02N 2/02* | (2006.01) |
| *B06B 1/12* | (2006.01) |

(52) U.S. Cl.
CPC ................. *G02B 7/02* (2013.01); *B06B 1/06* (2013.01); *B06B 1/12* (2013.01); *H02N 2/006* (2013.01); *H02N 2/0025* (2013.01); *H02N 2/0055* (2013.01); *H02N 2/0065* (2013.01); *H02N 2/026* (2013.01); *B06B 1/0644* (2013.01)

(58) Field of Classification Search
CPC ...... H02N 2/001; H02N 2/026; H02N 2/0015; H02N 2/0085; H02N 2/006; H02N 2/0065; H01L 41/09; G02B 7/02; G02B 7/102; G02B 7/10; G02B 7/023; G02B 7/04; G02B 7/08; G02B 7/021; G11B 7/0935; G11B 7/0932
USPC ................ 359/811–830, 694, 696, 703–704; 310/323.16, 323.02, 323.09, 310/323.01–323.19, 328
See application file for complete search history.

(56) References Cited

U.S. PATENT DOCUMENTS

| | | | | |
|---|---|---|---|---|
| 2005/0062346 A1* | 3/2005 | Sasaki | .................... | G02B 7/102 310/323.05 |
| 2009/0015099 A1* | 1/2009 | Mukae | .................. | H01L 41/053 310/323.01 |
| 2010/0060107 A1* | 3/2010 | Seki | ....................... | H02N 2/004 310/323.16 |
| 2015/0183001 A1* | 7/2015 | Yamamoto | ............ | B06B 1/0644 310/334 |

(Continued)

FOREIGN PATENT DOCUMENTS

JP 2015-126692 A 7/2015

*Primary Examiner* — Dawayne Pinkney
(74) *Attorney, Agent, or Firm* — Venable LLP

(57) ABSTRACT

A vibration wave motor includes a vibrator, a pressing member configured to press the vibrator against a friction member, a holding member configured to hold the vibrator, and a buffering member provided between the vibrator and the holding member. The vibrator and the friction member are moved relatively to each other in a relative movement direction by vibration of the vibrator, and the holding member holds the vibrator in such a manner that an extending part extending in a pressing direction of the pressing member sandwiches the vibrator and the buffering member.

13 Claims, 14 Drawing Sheets

(56) References Cited

U.S. PATENT DOCUMENTS

2016/0118913 A1* 4/2016 Nishitani .............. H02N 2/001
310/323.05
2016/0141979 A1   5/2016 Ninomiya

* cited by examiner

VIBRATION WAVE MOTOR AND LENS DRIVING APPARATUS

BACKGROUND OF THE INVENTION

Field of the Invention

The present invention relates to a vibration wave motor, and more particularly, to a linear vibration wave motor including a plate-shaped elastic body, and a lens driving apparatus using the linear vibration wave motor.

Description of the Related Art

Heretofore, vibration wave motors characterized by enabling a reduction in size and weight, high-speed driving, and silent driving have been employed as, for example, actuators for a lens barrel of an imaging device. Among these motors, a vibration wave motor for linear driving as described below is disclosed in Japanese Patent Application Laid-Open No. 2015-126692.

The vibration wave motor disclosed in Japanese Patent Application Laid-Open No. 2015-126692 includes a vibrator including a piezoelectric element and an elastic body, a friction member that comes into frictional contact with the vibrator, and a holding member that holds the vibrator. A high-frequency vibration is generated on the vibrator and an elliptic motion is generated on a leading end of a protrusion provided on the vibrator, thereby enabling the vibrator to be moved relatively to the friction member. The vibrator is fixed to the holding member, so that a driving force of the vibrator can be transmitted to the outside through the holding member.

SUMMARY OF THE INVENTION

In the vibration wave motor disclosed in Japanese Patent Application Laid-Open No. 2015-126692, a holding unit to be fixed to the holding member provided on the vibrator is provided in a relative movement direction of the vibrator. This causes a problem that the size of the structure in the relative movement direction (longitudinal direction) is increased by the amount corresponding to the holding unit.

A structure in which a holding projection provided on a vibrating plate is held without using the holding unit enables a reduction in the length of the structure in the longitudinal direction. However, in this structure, a pressurizing or pressing force that is actually generated on the vibrator corresponds to a difference between a holding force for holding the holding projection on the vibrating plate and a pressurizing or pressing force of a pressurizing member for pressuring or pressing the vibrator.

Therefore, it is necessary to increase the pressurizing force of the pressurizing member in order to obtain a sufficient pressurizing force. However, if a sufficient pressurizing force is obtained without changing a spring constant of a pressurizing spring serving as the pressurizing member, problems such as an increase in the size of the pressurizing member and an increase in sliding resistance along with an increase in reaction force of the pressurizing spring are raised.

Accordingly, an object of the present invention is to provide a vibration wave motor in which a vibrator can be directly held by a holding member without increasing the size of a pressurizing member and a reduction in the size of the vibrator in a relative movement direction can be achieved.

In order to solve the above-mentioned problems, provided is a vibration wave motor according to the present invention including: a vibrator; a pressurizing member configured to pressurize the vibrator against a friction member; a holding member configured to hold the vibrator; and a buffering member provided between the vibrator and the holding member. The vibrator and the friction member are moved relatively to each other in a relative movement direction by vibration of the vibrator. The holding member holds the vibrator in such a manner that an extending part extending in a pressurizing direction of the pressurizing member sandwiches the vibrator and the buffering member.

According to the present invention, the provision of the buffering member between the vibrator and the holding member enables the holding member to hold the vibrator through the buffering member, so that the size of the pressurizing member is not increased more than necessary.

Further, since the holding member holds the vibrator by sandwiching the vibrator and the buffering member, a reduction in the size of the vibrator in the relative movement direction can be achieved without increasing the size of the pressurizing member more than necessary.

Further features of the present invention will become apparent from the following description of exemplary embodiments with reference to the attached drawings.

DESCRIPTION OF THE EMBODIMENTS

Figure 1A:
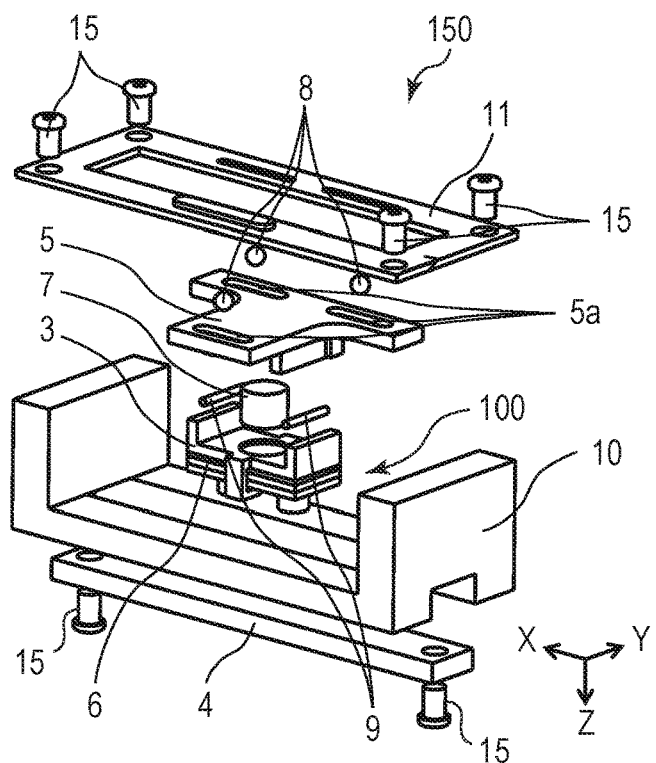
FIGS. 1A and 1B are exploded perspective views each illustrating a vibration wave motor according to a first embodiment of the present invention.

Preferred embodiments of the present invention will now be described in detail in accordance with the accompanying drawings.

In the drawings, the same reference numerals are assigned to the same members. Herein, a relative movement direction in which a vibrator 100, which is described later, and a friction member 4 are moved relatively to each other is defined as an X-direction, and a pressurizing direction in which the vibrator 100 is pressed against the friction member 4 is defined as a Z-direction. In the Z-direction, a direction from the vibrator 100 to the friction member 4 is defined as a +Z-direction, and a direction from the friction member 4 to the vibrator 100 is defined as a −Z-direction. A direction orthogonal to each of the relative movement direction (X-direction) and the pressurizing direction (Z-direction) is defined as a Y-direction.

(First Embodiment)

Figure 1B:
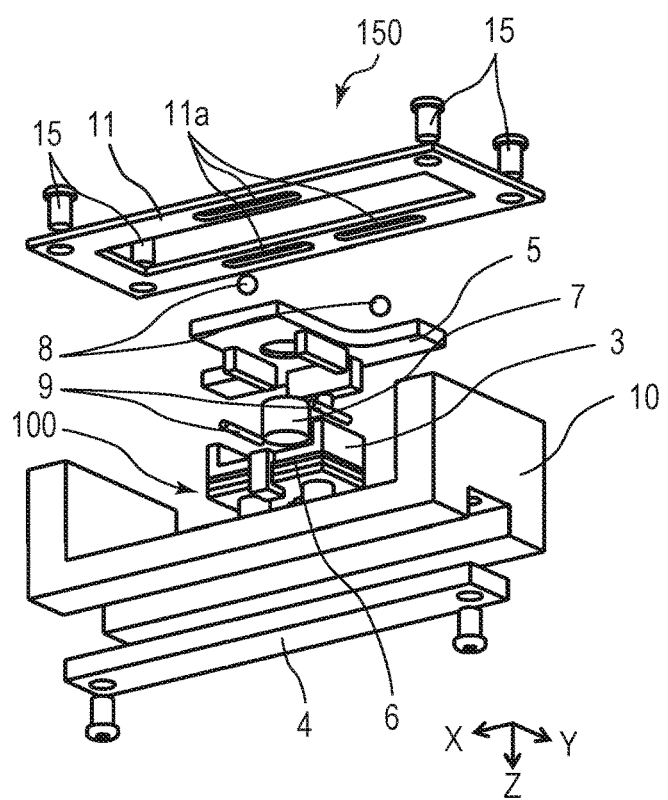

A first embodiment of the present invention will be described below. FIGS. 1A and 1B are exploded perspective views each illustrating a vibration wave motor 150 according to the first embodiment, and each of the perspective views is viewed from different angles. The vibrator 100 includes an elastic body 1 and a piezoelectric element 2. A detailed structure of the vibration wave motor 150 is described later. The structure of the vibrator 100 will now be described.

Figure 2A:
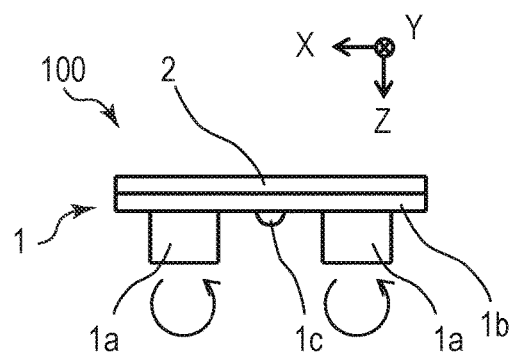
FIGS. 2A, 2B, 2C and 2D are diagrams each illustrating a vibrator according to the first embodiment of the present invention.
Figure 2C:
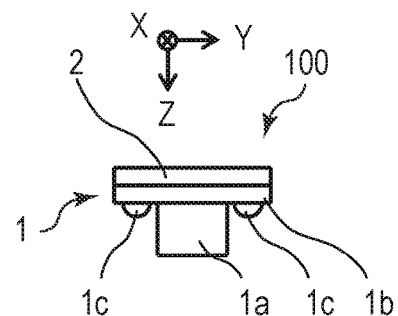
Figure 2B:
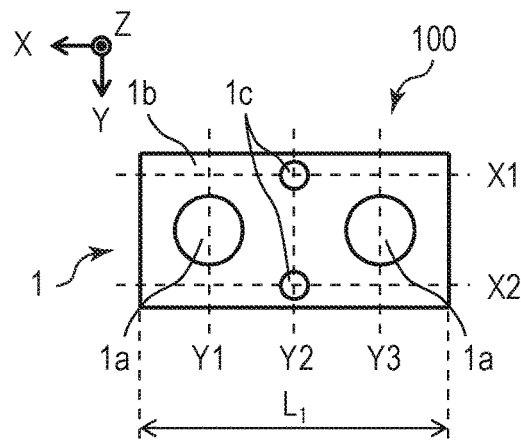
Figure 2D:
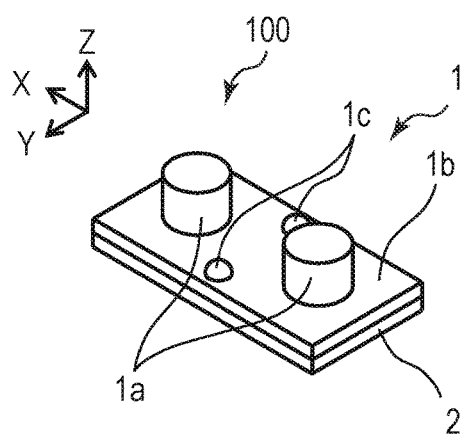

FIGS. 2A to 2D are diagrams each illustrating the vibrator 100 according to the first embodiment. FIG. 2A is a front view of the vibrator 100. FIG. 2B is a bottom view of the vibrator 100. FIG. 2C is a side view of the vibrator 100. FIG. 2D is a perspective view of the vibrator 100. The elastic body 1 serving as a vibrating plate includes a rectangular flat plate part 1b and protrusions 1a provided on the flat plate part 1b. The vibrator 100 has a structure in which the piezoelectric element 2 that vibrates at a high frequency is fixed to a surface of the flat plate part 1b that is opposite to the protrusions 1a of the elastic body 1. Two protrusions 1a arranged in the X-direction may be provided integrally with the flat plate part 1b, or may be provided separately. The vibrator 100 is set to resonate in a natural vibration mode in each of the X-direction corresponding to a longitudinal direction and the Y-direction corresponding to a lateral direction by applying a high-frequency voltage to the piezoelectric element 2. As a result of this resonation, the vibrator 100 vibrates at a high frequency and an elliptic motion as illustrated in FIG. 2A is generated at a leading end of each protrusion 1a.

The vibrator 100 is pressed and brought into contact with the friction member 4 (see FIG. 1A). The elliptic motion is generated in a state where the vibrator 100 is pressed against the friction member 4, thereby obtaining a driving force through a frictional force. Thus, the vibrator 100 can be moved relatively to the friction member 4 by the elliptic motion generated from the high-frequency vibration.

Two holding projections 1c each having a projecting shape for holding the vibrator 100 are provided on a surface of the flat plate part 1b that is the same as the surface on which the protrusions 1a are provided. The holding projections 1c are arranged in the Y-direction. In FIG. 2B, dotted lines X1 and X2 each indicate a node of a bending vibration primary mode in an orthogonal direction that is generated in the vibrator 100 by the high-frequency voltage of the piezoelectric element 2. Dotted lines Y1, Y2, and Y3 each indicate a node of a bending vibration secondary mode in the relative movement direction that is generated in the vibrator 100 by the high-frequency voltage of the piezoelectric element 2. The holding projections 1c are provided at positions corresponding to intersections among X1, X2, and Y2 that are two nodes in the natural vibration mode. This structure prevents the holding projections 1c from inhibiting the vibration of the vibrator 100.

Figure 3B:
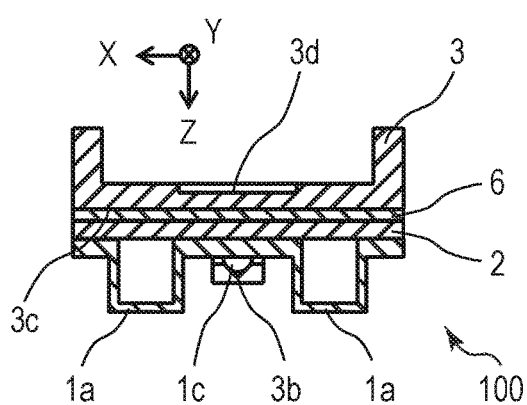
FIGS. 3A, 3B, 3C and 3D are diagrams each illustrating a method for holding the vibrator according to the first embodiment of the present invention.
Figure 3D:
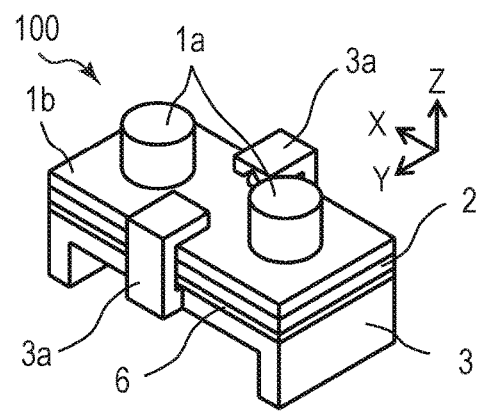
Figure 3A:
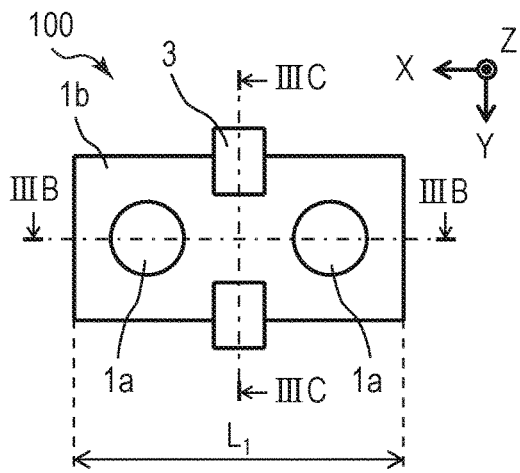
Figure 3C:
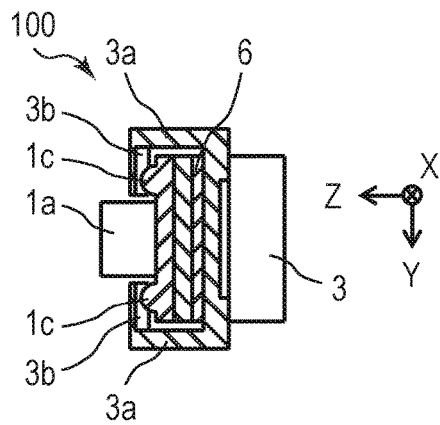

FIGS. 3A to 3D are diagrams each illustrating a method for holding the vibrator 100 according to the first embodiment. FIG. 3A is a bottom view of the vibrator 100 and corresponds to FIG. 2B. FIG. 3B is a sectional view taken along a line IIIB-IIIB in FIG. 3A. FIG. 3C is a sectional view taken along a line IIIC-IIIC in FIG. 3A. FIG. 3D is a perspective view of the vibrator 100.

The holding member 3 includes two holding arm parts 3a (extending parts) that hold the vibrator 100 and have an L-shape extending in the pressurizing direction of a pressurizing member 7, which is described later, i.e., in a direction different from the relative movement direction. A holding recess 3b having a concave shape is provided at a leading end of each holding arm part 3a of the holding member 3. The holding recess 3b engages with the corresponding holding projection 1c of the vibrator 100.

A buffering member 6, which is, for example, felt, is fixed to a side of the piezoelectric element 2 that is opposite to the surface of the vibrator 100 on which the holding projections 1c are provided. The buffering member is provided between the vibrator 100 and the holding member 3. The holding member 3 holds the vibrator 100 in such a manner that a holding surface 3c and the holding recesses 3b of the holding arm parts 3a sandwich the vibrator 100 and the buffering member 6. The buffering member 6 may be made of a material other than felt, such as a porous material.

The dimension in the width direction (X-direction) of the holding arm parts 3a is smaller than the dimension in the length direction (Y-direction) thereof, so that the holding arm parts 3a can be elastically deformed. The holding projections 1c are urged by an urging force generated by the elastic deformation of the holding arm parts 3a. The holding member 3 holds the vibrator 100 by the holding force that is determined by the elastic deformation amount and rigidity of the holding arm parts 3a. The outer shape of the flat plate part 1b of the vibrator 100 can be set to be equal to or larger than the outer shape of the piezoelectric element 2. As illustrated in FIG. 3D, the flat plate part 1b of the vibrator 100 can be held within a projection plane of the piezoelectric element 2, which is advantageous in miniaturization of the vibrator 100 and the vibration wave motor 150.

Since the buffering member 6 is provided between the holding surface 3c and the piezoelectric element 2, the holding member 3 can hold the vibrator 100 without attenuating the high-frequency vibration generated on the vibrator 100. The holding projections 1c each have a spherical shape, and the holding recesses 3b are V-shaped grooves extending in a direction orthogonal to the relative movement direction. Accordingly, the holding projections 1c and the holding recesses 3b engage with each other to regulate movement of the vibrator in the relative movement direction relative to the holding member 3, thereby enabling the holding member 3 to hold the vibrator 100 with no backlash. Thus, the high-frequency vibration of the vibrator 100 enables the vibrator 100 and the holding member 3 to be integrally moved relatively to each other. The vibrator 100, the holding projection 1c, the holding member 3, the holding recess 3b, and the buffering member 6 respectively correspond to a vibrator, a holding projection, a holding member, a holding recess, and a buffering member according to the present invention.

Figure 4A:
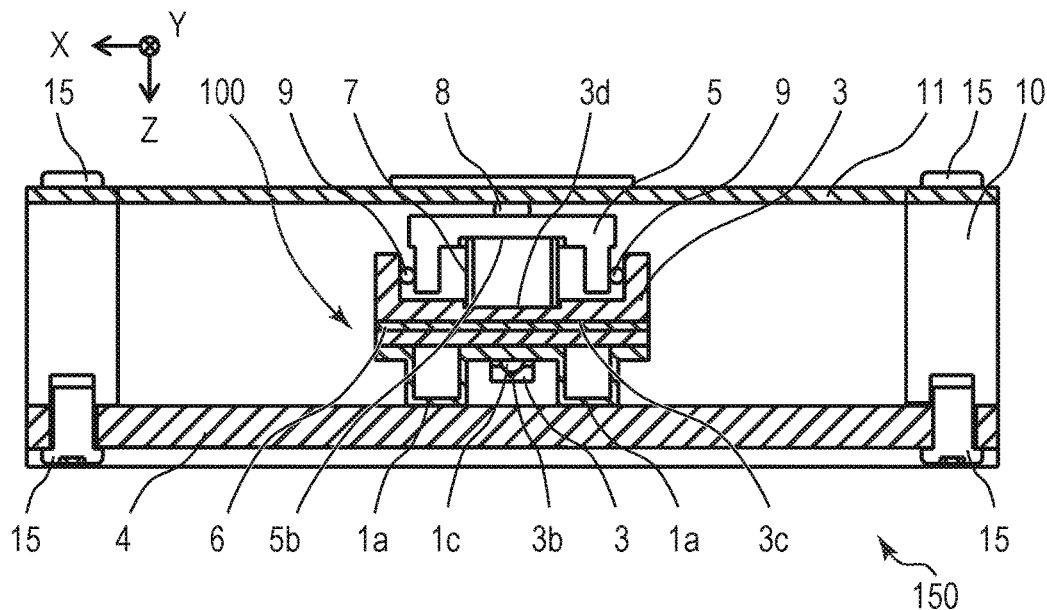
FIGS. 4A and 4B are sectional views each illustrating the structure of the vibration wave motor according to the first embodiment of the present invention.
Figure 4B:
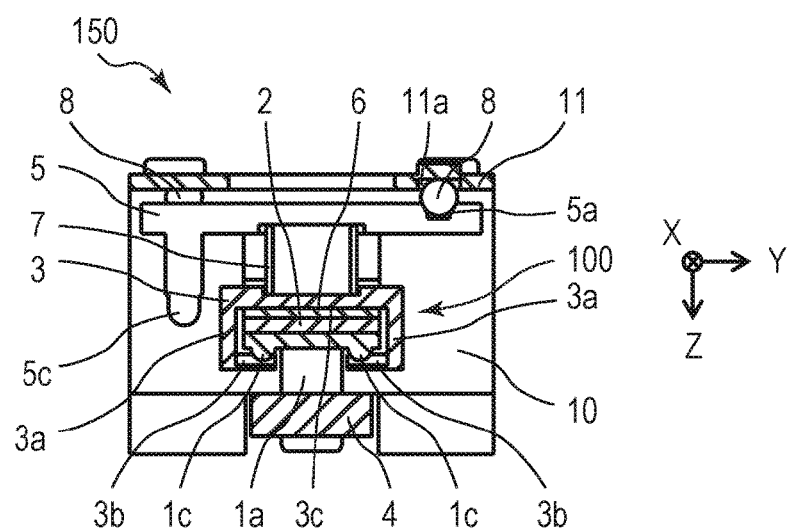

FIGS. 4A and 4B are sectional views each illustrating the structure of the vibration wave motor 150 according to the first embodiment. FIG. 4A is a sectional view taken along a plane (XZ plane) which passes the center of the pressurizing member 7, which is described later, and includes the relative movement direction (X-direction) and the pressurizing direction (Z-direction). FIG. 4B is a sectional view taken along a plane (YZ plane) which passes the center of the pressurizing member 7, which is described later, and the holding projection 1c and includes the direction (Y-direction) orthogonal to each of the relative movement direction (X-direction) and the pressurizing direction (Z-direction) and the pressurizing direction (Z-direction). The structure of the vibration wave motor 150 according to the first embodiment will be described with reference to FIG. 1A and FIGS. 4A and 4B.

The friction member 4 and the cover member 11 are each fixed to the base member 10 with a plurality of screws 15. The pressurizing member 7 is a compression spring that acts on an operating surface 3d of the holding member 3 and an operating surface 5b of a movable member 5, thereby allowing the vibrator 100 to be pressed against the friction member 4 through the holding member 3 and the buffering member 6. When the pressurizing member 7 presses the vibrator 100 through the buffering member 6, advantageous effects such as dispersion and adjustment of a pressurizing force applied from a pressurizing plate (not illustrated) and suppression of attenuation of the high-frequency vibration generated on the vibrator 100 can be obtained.

Rollers 9 are provided between a side wall of the movable member 5 and an inside wall of the holding member 3, and the rollers 9 are each configured to be able to roll between the side wall of the movable member 5 and the inside wall of the holding member 3. Accordingly, the relative movement of the movable member 5 and the holding member 3 in the pressurizing direction (Z-direction) is not regulated and the relative movement of the vibrator 100 in the relative movement direction (X-direction) is regulated.

In the structure in which the relative movement of the movable member 5 and the holding member 3 in the Z-direction is not regulated, a height error in the pressurizing direction that is generated due to a component tolerance, an erection tolerance, or the like can be absorbed and the protrusions 1a of the vibrator 100 can be stably brought into contact with the friction member 4. Further, when the vibrator 100 is moved relatively to the friction member 4 by regulating the relative movement of the movable member 5 and the holding member 3 in the X-direction, the movable member 5 can be moved relatively to the friction member 4 in a state where the vibrator 100 and the holding member 3 are integrated with no backlash. The protrusions 1a have a hollow shape as illustrated in FIG. 3A, but instead may have a solid shape. The same holds true for the other embodiments.

A rolling mechanism for reducing a sliding load between the movable member 5 and the cover member 11 during the relative movement is now described. Rolling groove parts 11a are provided on a surface of the cover member 11 at which the movable member 5 is disposed, and rolling groove parts 5a are provided on a surface of the movable member 5 at which the cover member 11 is provided. The rolling groove part 11a and the rolling groove part 5a are provided at opposed positions, and as illustrated in FIG. 1A, three spherical rolling members 8 are sandwiched between the rolling groove parts 11a and the rolling groove parts 5a.

The pressurizing member 7 acts on the operating surface 5b of the movable member 5, thereby allowing the movable member 5 to be pressed against the cover member 11 through the rolling member 8. The three rolling members 8 are provided between the rolling groove parts 11a of the cover member 11 and the rolling groove parts 5a of the movable member 5, thereby holding the cover member 11 and the movable member 5 to be smoothly movable in the relative movement direction. The high-frequency vibration enables the movable member 5 to be integrated with the vibrator 100 and moved relatively to the friction member 4. In this case, the rolling members 8 roll between the rolling groove parts 11a and the rolling groove parts 5a, thereby reducing the sliding load generated between the movable member 5 and the cover member 11 during the relative movement.

Among three pairs of the rolling groove part 11a and the rolling groove part 5a that are opposed to each other, two pairs of the rolling groove part 11a and the rolling groove part 5a have a V-shaped slope and are formed as recesses extending in the X-direction. In the structure in which the rolling members 8 are sandwiched between two pairs of V-shaped recesses, the movable member 5 is guided to advance straight in the relative movement direction with no backlash in the orthogonal direction (Y-direction). The friction member 4 and the pressurizing member 7 respectively correspond to a friction member and a pressurizing member according to the present invention.

Figure 5A:
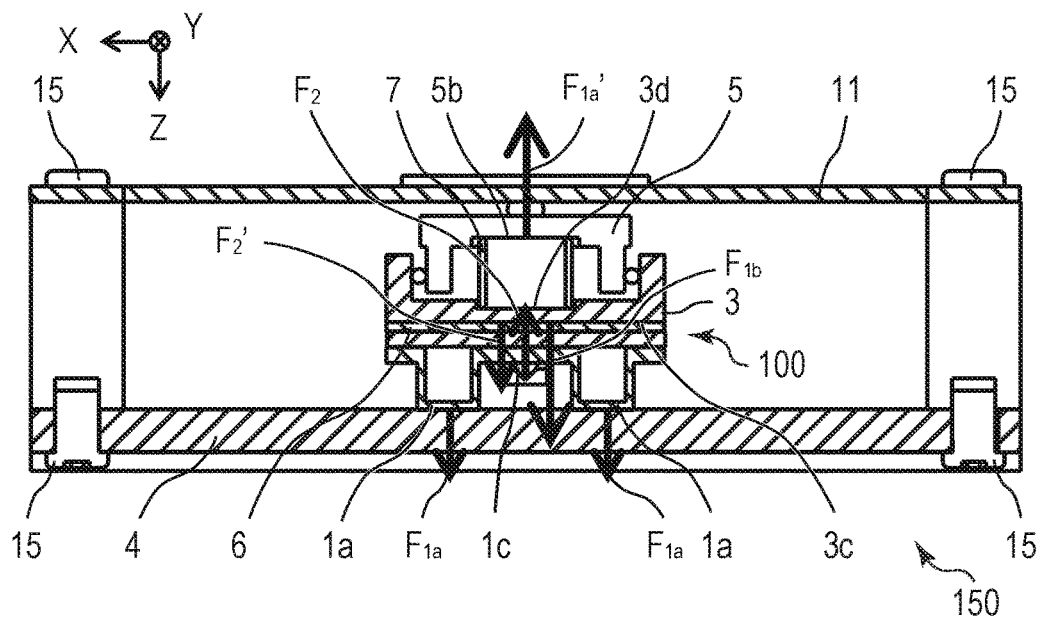
FIGS. 5A and 5B are diagrams each illustrating a holding force and a pressurizing force of the vibration wave motor according to the first embodiment of the present invention.
Figure 5B:
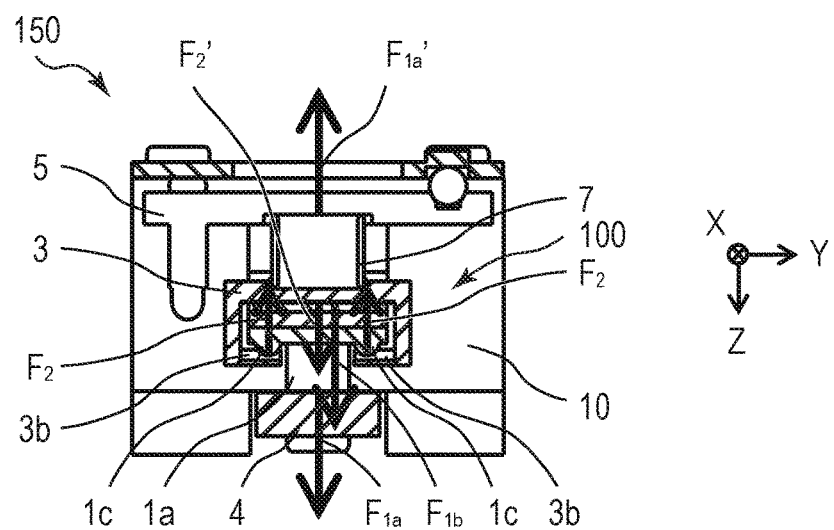

FIGS. 5A and 5B are diagrams each illustrating a holding force and a pressurizing force of the vibration wave motor 150 according to the first embodiment. In the figures, arrows respectively indicate the holding force for holding the vibrator 100, the pressurizing force for pressing the vibrator 100 against the friction member 4, and the reaction force thereof. FIG. 5A is a sectional view taken along a plane (XZ plane) which passes the center of the pressurizing member 7 and includes the relative movement direction (X-direction) and the pressurizing direction (Z-direction). FIG. 5B is a sectional view taken along a plane (YZ plane) which passes the center of the pressurizing member 7 and the holding projection 1c and includes the orthogonal direction (Y-direction) and the pressurizing direction (Z-direction).

A pressurizing force $F_{1a}$ is a pressurizing force for pressing the vibrator 100 against the friction member 4, and a pressurizing force $F_{1b}$ is a pressurizing force for pressing the holding member 3 against the buffering member 6. A pressurizing reaction force $F_{1a}'$ is a reaction force of the pressurizing force $F_{1a}$ and is a pressuring reaction force for pressing the movable member 5 against the cover member 11. A holding force $F_2$ is a holding force for the holding member 3 to hold the vibrator 100, and a holding reaction force $F_2'$ is a reaction force generated along with the holding force $F_2$ and is a holding reaction force to be applied from the holding member 3 to the buffering member 6.

The pressurizing force $F_{1b}$ and the holding reaction force $F_2'$ are illustrated at positions deviating from the center of the vibrator 100 in each of the X-direction and the Y-direction. However, in the actual structure, the pressurizing force and the holding reaction force are applied at the center of the vibrator 100. The magnitude of each of the pressurizing force $F_{1a}$ and the pressurizing reaction force $F_{1a}'$ is determined by the spring constant of the pressurizing member 7 and the amount of compression from a free length. The magnitude of each of the holding force $F_2$ and the holding reaction force $F_2$40 is determined by the elastic deformation amount and rigidity of the holding arm parts 3a of the holding member 3.

In the structure of the first embodiment, the vibrator 100 and the buffering member 6 are sandwiched between the holding surface 3c and the holding recess 3b of the holding member 3, and the vibrator 100 is held by the holding force $F_2$ determined by the elastic deformation amount and rigidity of the holding arm parts 3a. The holding force $F_2$ and the holding reaction force $F_2{}'$ are closed in the buffering member 6 and the vibrator 100, which prevents the holding force $F_2$ from cancelling out the pressurizing force $F_{1b}$ and reducing the pressurizing force $F_{1a}$. In the structure of the first embodiment, the pressurizing force $F_{1a}$ does not become smaller than the holding force $F_2$, which eliminates the need for increasing the size of the pressurizing member 7 more than necessary. The pressurizing force $F_{1b}$ and the holding reaction force $F_2{}'$ respectively correspond to a pressurizing force and a holding reaction force according to the present invention.

Figure 6:
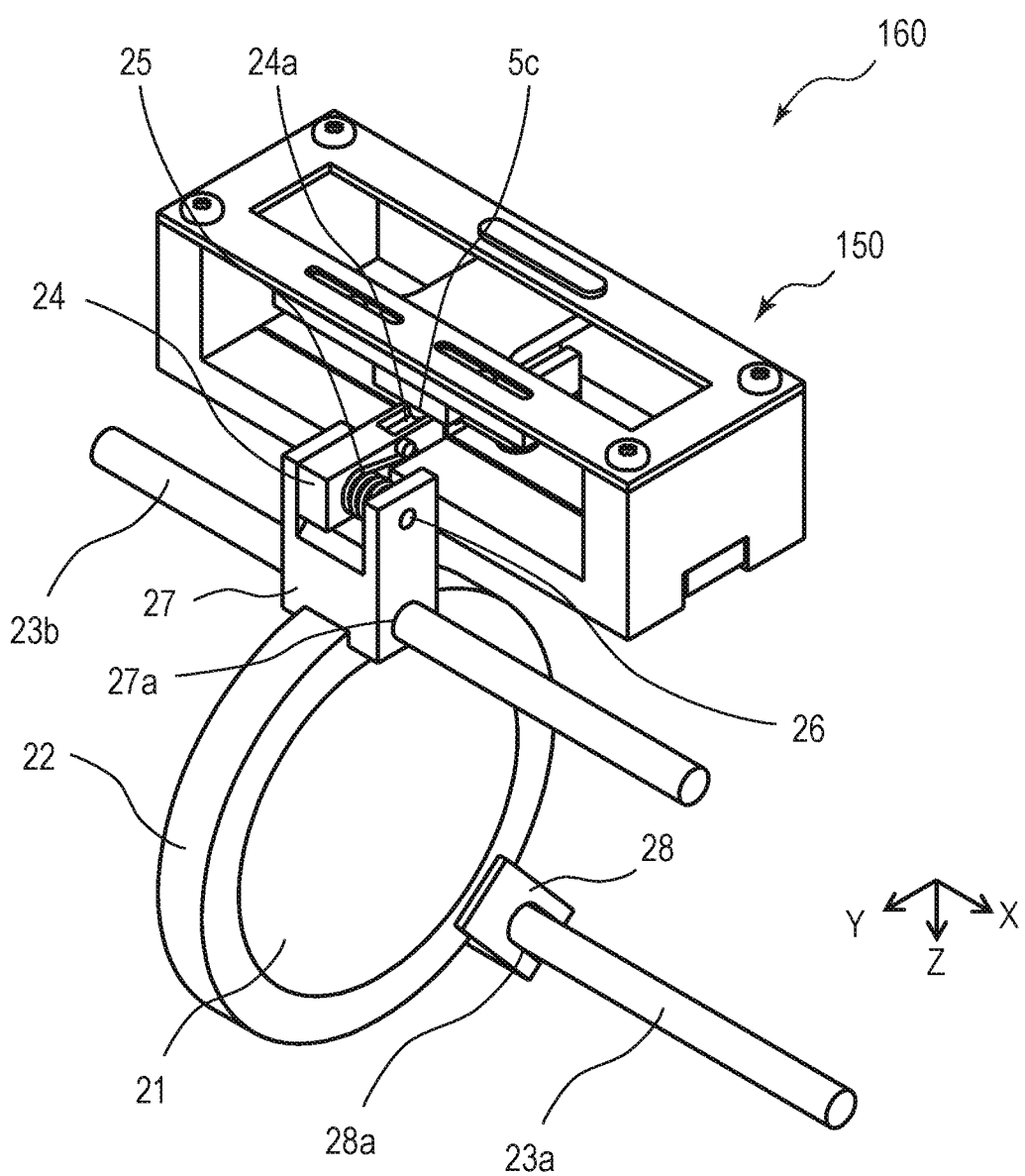
FIG. 6 is a diagram illustrating a lens driving apparatus according to the first embodiment of the present invention.

FIG. 6 is a diagram illustrating a lens driving apparatus 160 including the vibration wave motor 150 according to the first embodiment. A lens 21 is held by a lens holding member 22. A connecting member 27 and a clip member 28 into which a guiding member to be described later is inserted are fixed at two locations on the outer periphery of the lens holding member 22. The connecting member 27 includes a circular through-hole 27a through which the connecting member 27 penetrates in the X-direction, and the clip member 28 includes a through-hole 28a through which the clip member 28 penetrates in the X-direction. The through-hole 28a is formed as an elongate hole having a predetermined length in the radial direction thereof. The connecting member 27 and the clip member 28 may be integrally formed with the lens holding member 22.

The lens driving apparatus 160 includes guiding members 23a and 23b which are fixed to a fixing member (not illustrated). The guiding member 23a engages with the through-hole 28a, and the guiding member 23b engages with the through-hole 27a. This structure allows the lens 21 and the lens holding member 22 to be guided to advance straight in an optical axis direction (X-direction in FIG. 6).

A coupling member 24 is attached to a fixed shaft 26, which is provided on the connecting member 27, in such a manner that the coupling member 24 is rotatable about an X-axis. An urging member 25 which is attached to the fixed shaft 26 generates an urging force about the X-axis on the coupling member 24. This urging force allows a recess 24a, which is provided on the coupling member 24, to be urged against a driving force drawing part 5c of the movable member 5 in the pressurizing direction (−Z-direction). The driving force drawing part 5c having a spherical shape engages with the recess 24a having a V-shaped slope, thereby allowing the coupling member 24 to move integrally with the movable member 5 in the relative movement direction with no backlash.

The urging member 25 urges the coupling member 24 against the lens holding member 22 in the relative movement direction (X-direction). This allows the coupling member 24 to be moved integrally with lens holding member 22 in the relative movement direction with no backlash. Thus, the lens holding member 22 is configured to be movable integrally with the movable member 5 in the relative movement direction through the coupling member 24 with no backlash.

As described above, the vibration wave motor 150 applies the high-frequency voltage to the piezoelectric element 2 to generate the high-frequency vibration on the vibrator 100, so that the relative movement of the vibrator 100 and the friction member 4 enables the movable member 5 to move in the relative movement direction. Accordingly, the lens driving apparatus 160 can move the lens 21 in the optical axis direction, which is the relative movement direction, by the relative movement of the vibrator 100 and the friction member 4. The lens 21 corresponds to a lens according to the present invention.

In the lens driving apparatus 160 illustrated in FIG. 6, each of the vibration wave motors according to the second to fourth embodiments, which are described later, can be used as a drive source.

The relative movement of the vibrator 100 and the friction member 4 includes a case where the vibrator 100 moves relatively to the friction member 4 and a case where the friction member 4 moves relatively to the vibrator 100. The same holds true for the vibration wave motors according to the second to fourth embodiments described below.

FIGS. 14A to 14D are diagrams each illustrating a method for holding a vibrator of the related art disclosed in Japanese Patent Application Laid-Open No. 2015-126692, and each corresponds to FIGS. 2A to 2D. A vibrator 900 includes an elastic body 901 and a piezoelectric element 902. A holding member 903 is a member for holding the vibrator 900, and is provided with holding projections 903e for holding the vibrator 900.

Figure 14A:
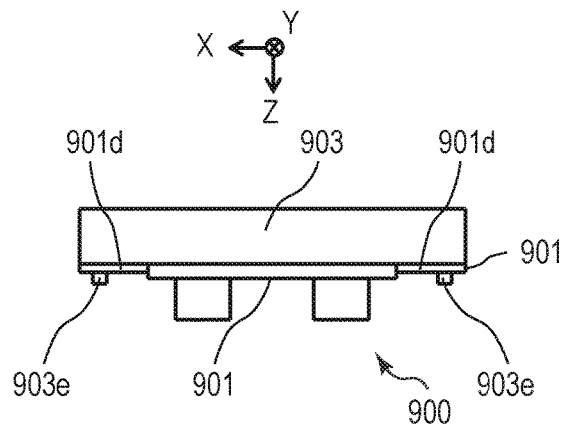
FIGS. 14A, 14B, 14C and 14D are diagrams each illustrating a method for holding a vibrator of a related art.
Figure 14C:
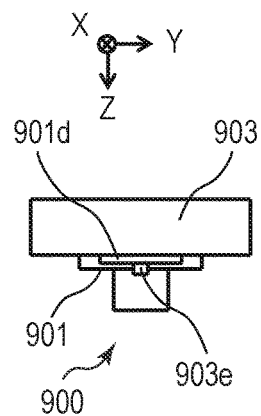
Figure 14B:
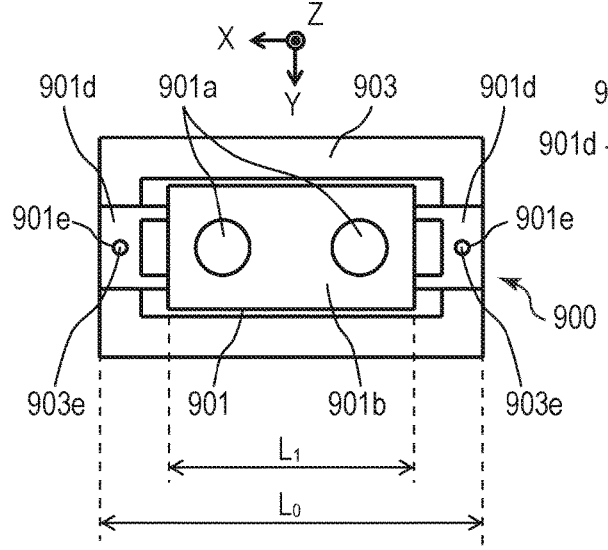
Figure 14D:
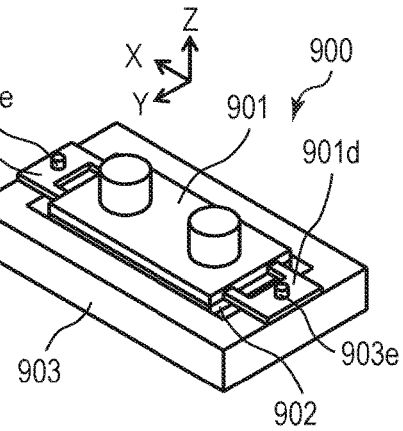

A holding unit 901d for holding the vibrator 900 is provided in the relative movement direction of the elastic body 901, and holding holes 901e, which are provided on the holding unit 901d, respectively engage with the holding projections 903e of the holding member 903 and are fixed thereto by bonding. Accordingly, the vibrator 900 and the holding member 903 are integrally moved in the relative movement direction with no backlash. At this time, the length of the vibrator 900 in the relative movement direction is represented by $L_0$ as illustrated in FIG. 14B.

On the other hand, in the first embodiment, the length of the vibrator 100 in the relative movement direction is represented by $L_1$ as illustrated in FIG. 3A. In the related art, the holding unit 901d is provided in the relative movement direction, while in the first embodiment, the holding projections 1c provided on the flat plate part 1b are held, which eliminates the need for providing the holding unit in the relative movement direction. Accordingly, the relationship between the length $L_1$ and $L_0$ in the relative movement direction is represented by $L_1 < L_0$. In the first embodiment, the length of the vibrator 100 in the relative movement direction can be reduced, thereby enabling miniaturization.

As described above, in the first embodiment, the holding projections 1c provided on the flat plate part 1b are respectively held by the holding recesses 3b of the holding member 3, so that the vibrator 100 can be held without the need for providing the holding unit in the relative movement direction. As a result, the holding member 3 holds the holding projections 1c provided on the vibrator 100 by sandwiching the holding projections, thereby reducing the length of the vibrator 100 in the relative movement direction and achieving miniaturization.

The first embodiment illustrates an example in which the holding projections 1c are provided on the vibrator 100 and the holding recesses 3b are provided on the holding member 3. However, the holding recesses may be provided on the vibrator 100 and the holding projections may be provided on the holding member 3.

Further, the first embodiment illustrates an example in which the holding projections 1c are provided at the intersections between the dotted lines X1 and X2 each representing a node of the bending vibration primary mode in the orthogonal direction and the dotted line Y2 representing a node of the bending vibration secondary mode in the relative movement direction. However, the holding projections 1c may be provided at the intersections between the dotted lines X1 and X2 and the dotted lines Y1 and Y3.

While the first embodiment illustrates an example in which two holding projections 1c are provided, the number of the holding projections 1c may be three or more.

While the first embodiment illustrates an example in which the buffering member 6 is fixed to the vibrator 100, the buffering member 6 may be fixed to the holding member 3.

(Second Embodiment)

Next, a vibration wave motor 250 according to a second embodiment of the present invention will be described. The first embodiment illustrates an example in which the pressurizing force $F_{1a}$ by the pressurizing member 7 and the holding reaction force $F_2'$ by the holding member 3 are applied at the same location. The second embodiment differs from the first embodiment in that the pressurizing force $F_{1a}$ by a pressurizing member 207 and the holding reaction force $F_2'$ by a holding member 203 are applied at different locations. Descriptions of components of the second embodiment that are the same as those of the first embodiment are omitted, and only components of the second embodiment that are different from those of the first embodiment will be described.

Figure 7B:
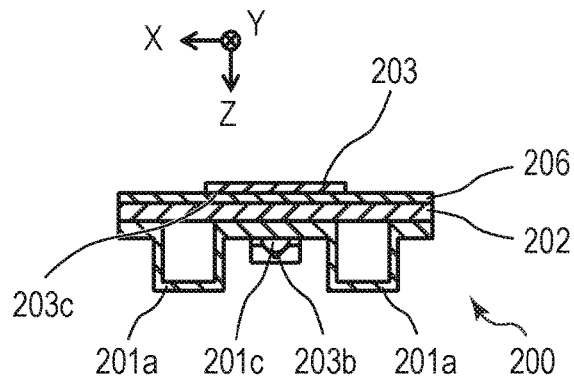
FIGS. 7A, 7B, 7C, 7D and 7E are diagrams each illustrating a method for holding a vibrator according to a second embodiment of the present invention.
Figure 7A:
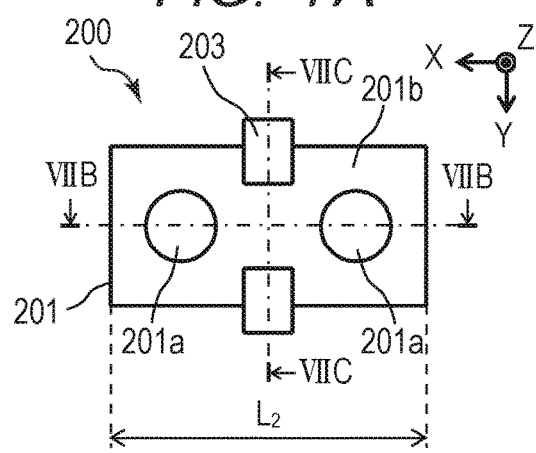
Figure 7C:
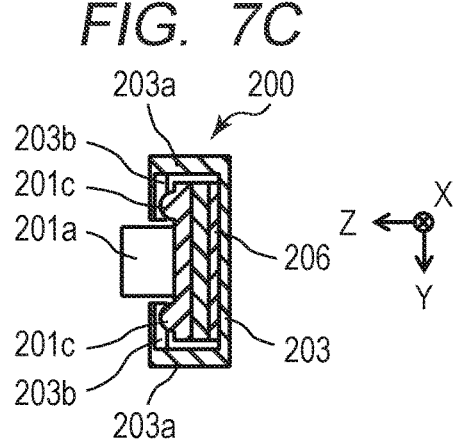
Figure 7D:
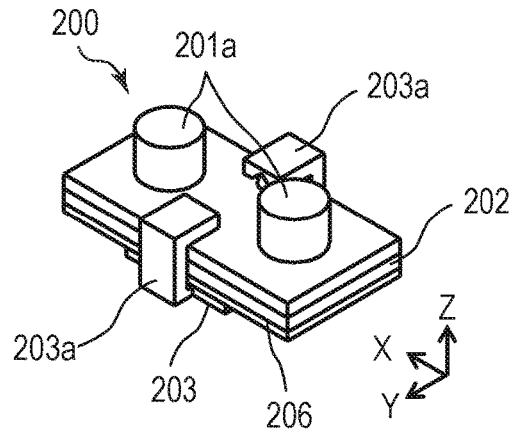
Figure 7E:
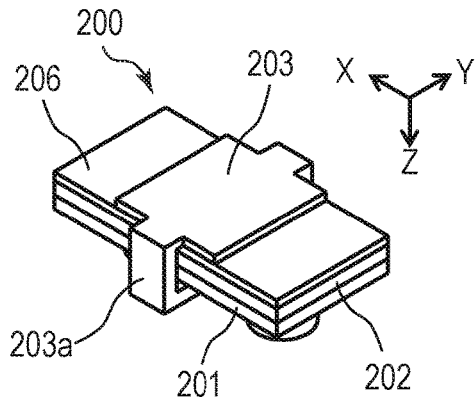

FIGS. 7A to 7E are diagrams each illustrating a vibrator 200 and a method for holding the vibrator 200 according to the second embodiment. FIGS. 7A to 7D correspond to FIGS. 3A to 3D, respectively. FIG. 7A is a bottom view of the vibrator 200. FIG. 7B is a sectional view taken along a line VIIB-VIIB in FIG. 7A. FIG. 7C is a sectional view taken along a line VIIC-VIIC in FIG. 7A. FIG. 7D is a perspective view of the vibrator 200. FIG. 7E is a perspective view as viewed from the bottom surface.

Figure 8A:
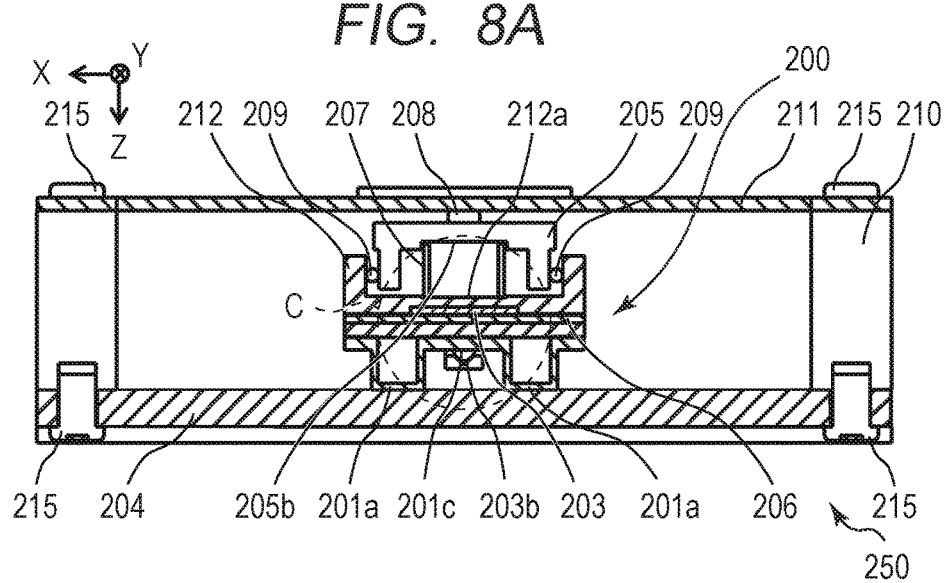
FIGS. 8A, 8B and 8C are diagrams each illustrating a structure of a vibration wave motor according to the second embodiment of the present invention.
Figure 8B:
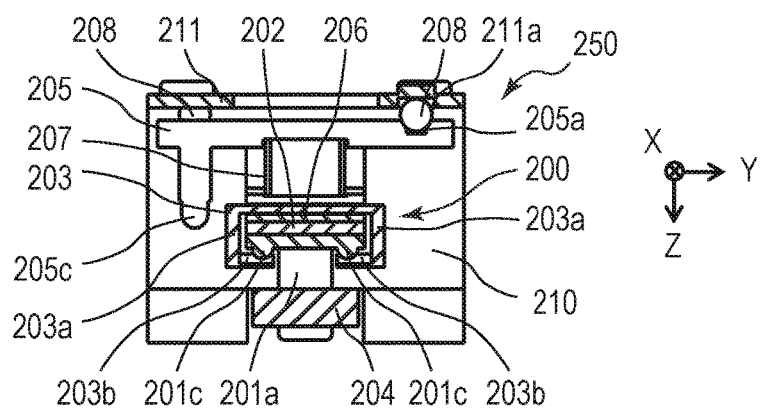
Figure 8C:
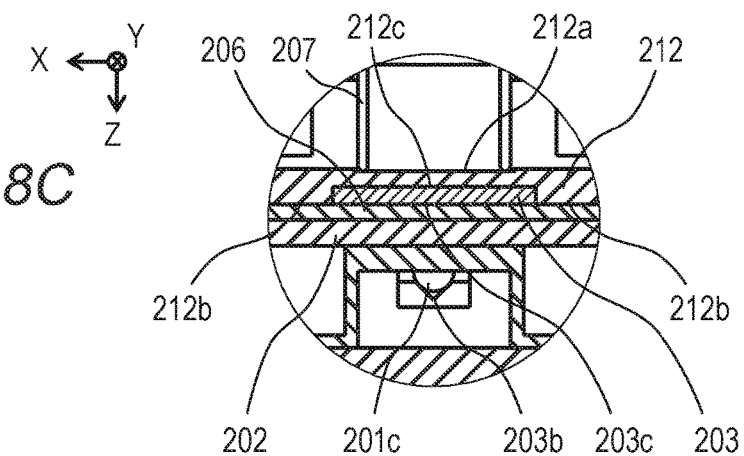
Figure 9A:
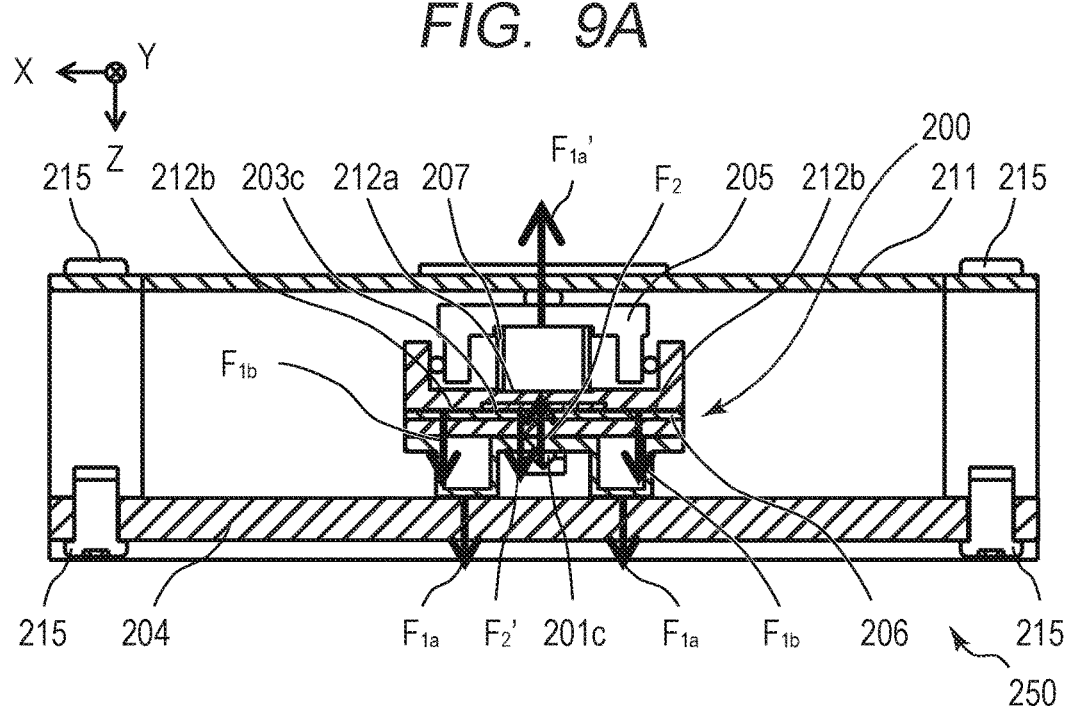
FIGS. 9A and 9B are diagrams each illustrating a holding force and a pressurizing force of the vibration wave motor according to the second embodiment of the present invention.
Figure 9B:
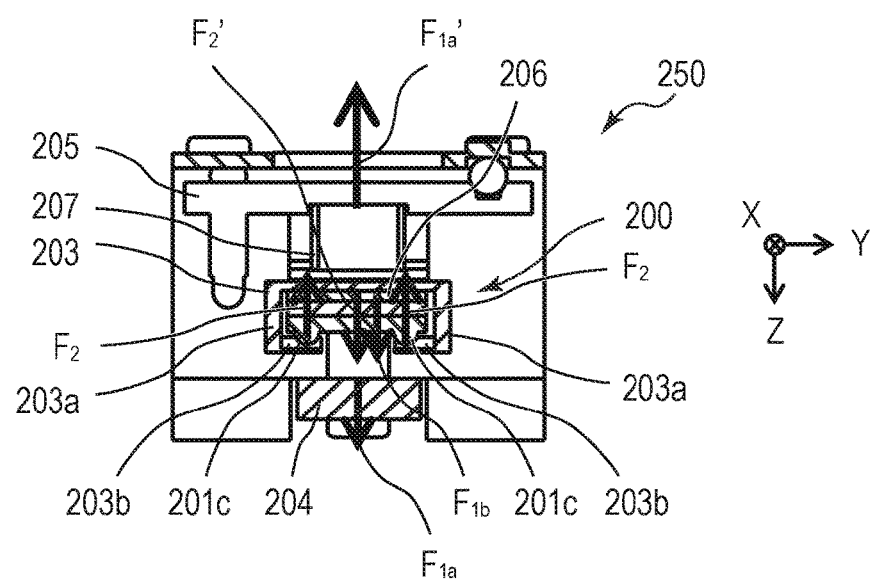
Figure 10B:
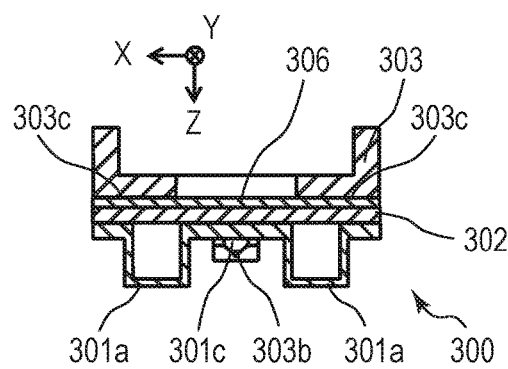
FIGS. 10A, 10B, 10C and 10D are diagrams each illustrating a method for holding a vibrator according to a third embodiment of the present invention.
Figure 10D:
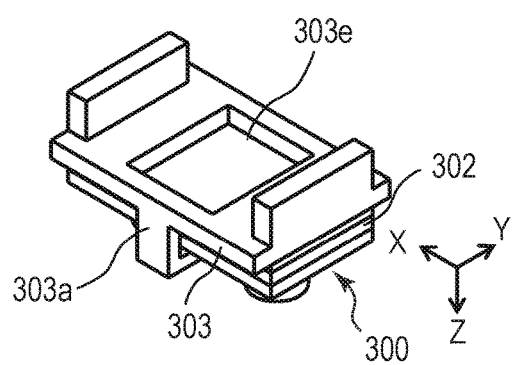
Figure 10A:
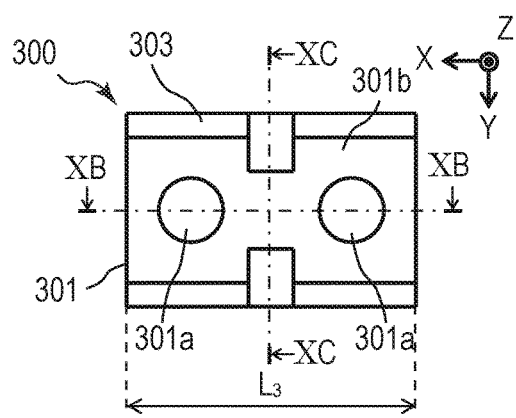
Figure 10C:
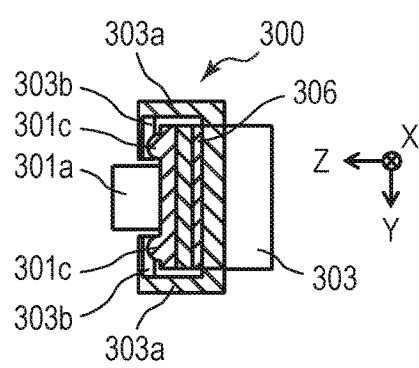

FIGS. 8A to 8C are diagrams each illustrating the structure of the vibration wave motor 250 according to the second embodiment. FIGS. 8A and 8B correspond to FIGS. 4A and 4B, respectively. FIG. 8C is an enlarged view illustrating a part indicated by "C" in FIG. 8A. FIGS. 9A and 9B are diagrams each illustrating the holding force and the pressurizing force of the vibration wave motor 250 according to the second embodiment, and correspond to FIGS. 5A and 5B, respectively.

As illustrated in FIGS. 8A to 8C, also in the second embodiment, a friction member 204 and a cover member 211 are each fixed to a base member 210 with a plurality of screws 215, like in the first embodiment. The pressurizing member 207 serves as a compression spring and acts on the holding member 203 and a movable member 205, thereby allowing the vibrator 200 to be pressed against the friction member 204 through the holding member 203 and a buffering member 206. When the pressurizing member 207 presses the vibrator 200 through the buffering member 206, advantageous effects such as dispersion and adjustment of a pressurizing force applied from a pressurizing plate 212 and suppression of attenuation of the high-frequency vibration generated on the vibrator 200 can be obtained.

Rollers 209 are provided between a side wall of the movable member 205 and an inside wall of the pressurizing plate 212, and the rollers 209 are each configured to be able to roll between the side wall of the movable member 205 and the inside wall of the pressurizing plate 212. The relative movement of the movable member 205 and the holding member 203 in the X-direction is regulated, thereby allowing the vibrator 200 to be moved relatively to the friction member 204. In this case, the movable member 205 can be moved relatively to the friction member 204 integrally with the vibrator 200 and the holding member 203 with no backlash.

A rolling mechanism for reducing a sliding load between the movable member 205 and the cover member 211 during the relative movement is similar to that of the first embodiment. Like in the first embodiment, the pressurizing member 207 acts on an operating surface 205b of the movable member 205, thereby allowing the movable member 205 to be pressed against the cover member 211 through a rolling member 208.

Among three pairs of a rolling groove part 211a and a rolling groove part 205a that are opposed to each other, two pairs of the rolling groove part 205a and the rolling groove part 211a are recesses each having a V-shaped slope. In the structure in which the rolling member 208 is sandwiched between two pairs of V-shaped recesses, the movable member 205 can be guided to advance straight in the relative movement direction with no backlash in the orthogonal direction (Y-direction). The friction member 204 and the pressurizing member 207 respectively correspond to a friction member and a pressurizing member according to the present invention.

As illustrated in FIGS. 7A to 7E, holding recesses 203b, which are provided on the holding member 203, respectively engage with holding projections 201c of the vibrator 200. The holding member 203 holds the vibrator 200 in such a manner that a holding surface 203c and the holding recesses 203b sandwich the vibrator 200 and the buffering member 206. In the first embodiment, the holding surface 3c of the holding member 3 is in contact with the entire surface of the buffering member 6, while in the second embodiment, the holding surface 203c of the holding member 203 is in contact with a part of the surface of the buffering member 206.

As illustrated in FIGS. 8A to 8C, the pressurizing plate 212 is a member for transmitting the pressurizing force of the pressurizing member 207 to each of the buffering member 206 and the vibrator 200. The pressurizing member 207 acts on an operating surface 212a, thereby allowing pressurizing surfaces 212b, which are provided at two locations, of the pressurizing plate 212 to pressurize the vibrator 200 against the friction member 204 through the buffering member 206. Since the holding member 203 engages with a recess 212c provided on the pressurizing plate 212, thereby forming the pressurizing plate 212 and the holding member 203 with no backlash in the relative movement direction.

The rollers 209 can roll between the side wall of the movable member 205 and the inside wall of the pressurizing plate 212. Accordingly, the vibrator 200 can be stably pressed against the friction member 204, and the vibrator 200 and the movable member 205 can be integrally moved relatively to each other with no backlash in the relative movement direction.

As illustrated in FIGS. 9A and 9B, the pressurizing member 207 acts on the operating surface 212a and the pressurizing surfaces 212b act on the buffering member 206, thereby allowing the vibrator 200 to be pressed by the pressurizing force $F_{1a}$. On the other hand, the holding reaction force $F_2'$ generated along with the holding force $F_2$ acts on the buffering member 206 at the holding surface 203c. When a force acting on the buffering member 206 is considered, the pressurizing force $F_{1a}$ acts on the pressurizing surfaces 212b, and the holding reaction force acts on the buffering member 206 at the holding surface 203c. The pressurizing force $F_{1b}$ and the holding reaction force $F_2'$ generated by the pressurizing member 207 are applied to the buffering member 206, and the pressurizing force $F_{1b}$ and the holding reaction force $F_2'$ are applied at different locations of the buffering member 206.

In the second embodiment, the holding projections 201c provided on the vibrator 200 are held, which eliminates the need for providing the holding unit in the relative movement direction, like in the first embodiment. Accordingly, a relational expression $L_2<L_0$ (see FIG. 7A and FIG. 14B) holds. Thus, in the second embodiment, the length of the vibrator 200 in the relative movement direction can be reduced and miniaturization can be achieved. Therefore, since the holding member 203 holds and sandwiches the holding projections 201c provided on the vibrator 200, the miniaturization of the vibrator 200 in the relative movement direction can be achieved.

In the first embodiment, the pressurizing force $F_{1b}$ and the holding reaction force $F_2'$ act on the buffering member 6 at one surface (holding surface 3c). On the other hand, in the second embodiment, the pressurizing force $F_{1b}$ and the holding reaction force $F_2'$ act on the buffering member 6 at the pressurizing surfaces 212b and the holding surface 203c, respectively. In other words, the pressurizing force $F_{1b}$ and the holding reaction force $F_2$40 act separately on the buffering member 206 at different locations. Therefore, in the second embodiment, the miniaturization of the vibrator 200 in the relative movement direction, as well as an advantageous effect that the vibrator 200 can be held while the holding member 203 is not affected by the pressurizing force $F_{1b}$ can be achieved.

(Third Embodiment)

A vibration wave motor 350 according to a third embodiment of the present invention will be described below. The second embodiment illustrates an example in which the pressurizing force $F_{1b}$ of the pressurizing member 207 is applied to the buffering member 206 at two locations on the pressurizing surfaces 212b. The third embodiment differs from the second embodiment in that a pressurizing force of a pressurizing member 307 is applied to a buffering member 306 at one location on the pressurizing surface 312b. Descriptions of components of the third embodiment that are the same as those of the second embodiment are omitted, and only components of the third embodiment that are different from those of the second embodiment will be described.

Figure 11A:
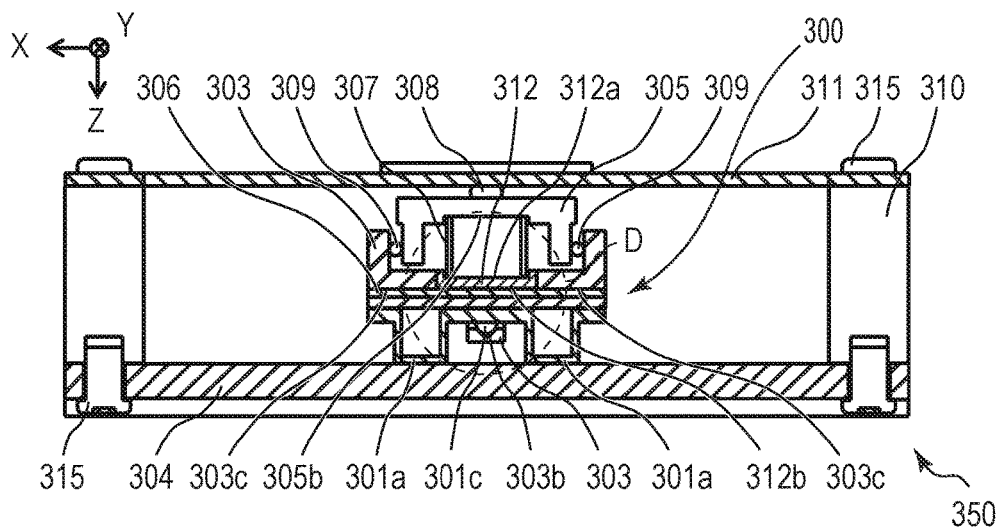
FIGS. 11A, 11B and 11C are diagrams each illustrating a structure of a vibration wave motor according to the third embodiment of the present invention.
Figure 11B:
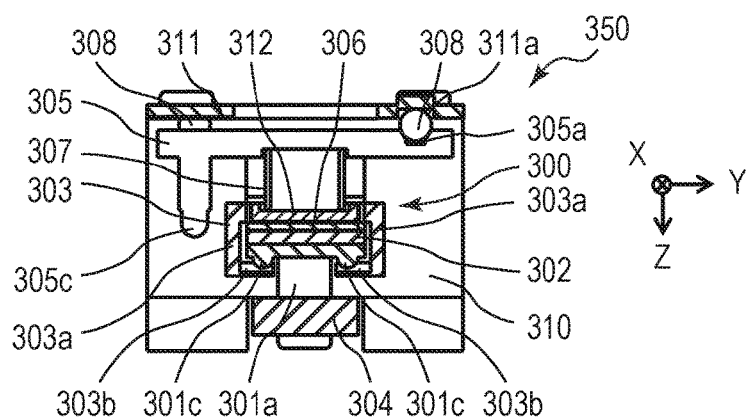
Figure 11C:
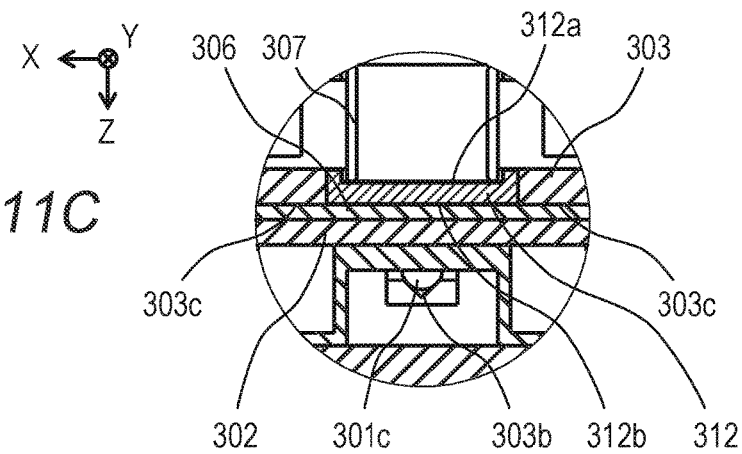
Figure 12A:
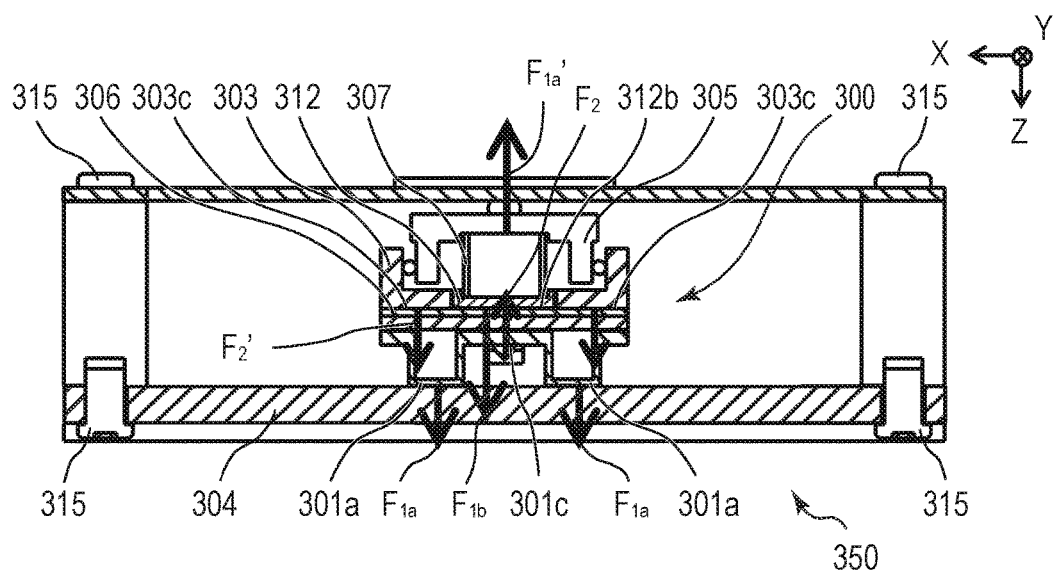
FIGS. 12A and 12B are diagrams each illustrating a holding force and a pressurizing force of the vibration wave motor according to the third embodiment of the present invention.
Figure 12B:
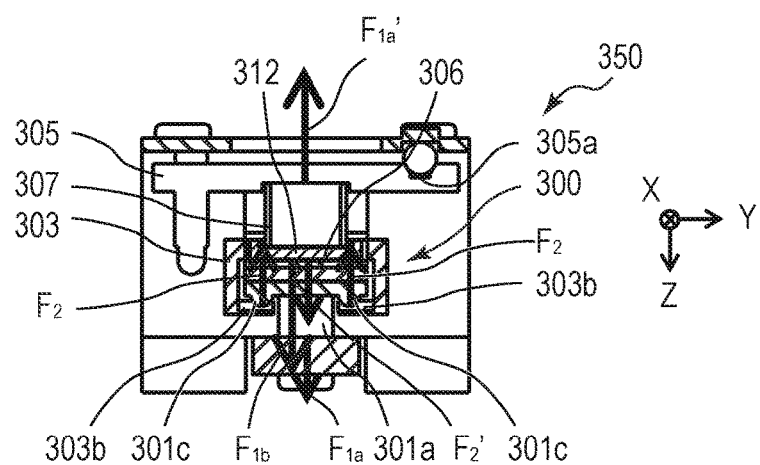
Figure 13B:
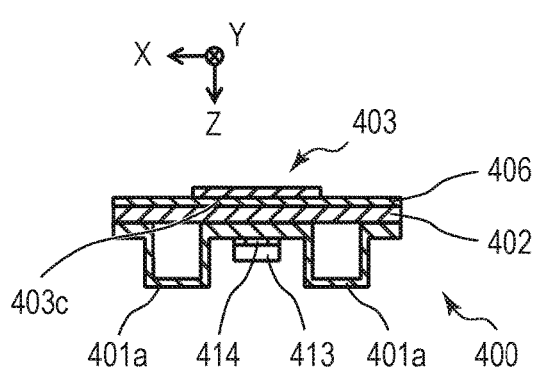
FIGS. 13A, 13B, 13C and 13D are diagrams each illustrating a method for holding a vibrator of a fourth embodiment of the present invention.
Figure 13D:
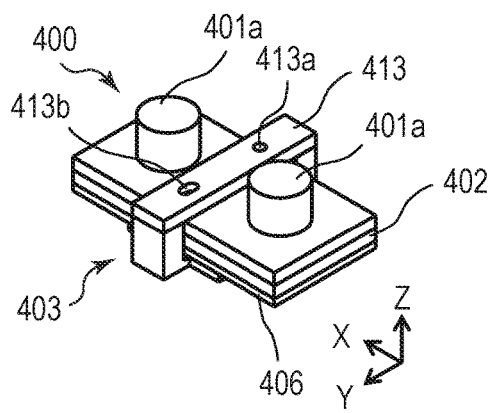
Figure 13A:
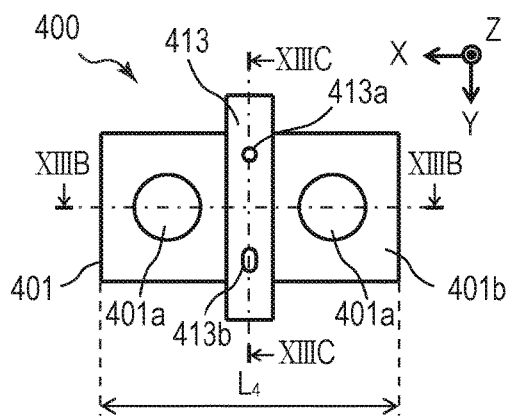
Figure 13C:
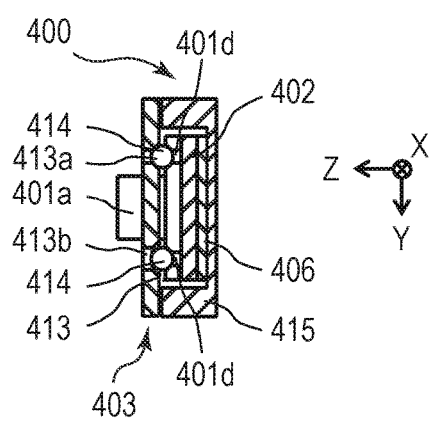

FIGS. 10A to 10D are diagrams each illustrating a vibrator 300 and a method for holding the vibrator 300 according to the third embodiment, and correspond to FIGS. 3A to 3D, respectively. FIGS. 11A to 11C are diagrams each illustrating the structure of the vibration wave motor 350 according to the third embodiment. FIGS. 11A and 11B correspond to the FIGS. 4A and 4B, respectively. FIG. 11C is an enlarged view illustrating a part indicated by "D" in FIG. 11A. FIGS. 12A and 12B are diagrams each illustrating a holding force and a pressurizing force of the vibration wave motor 350 according to the third embodiment, and correspond to FIGS. 5A and 5B, respectively.

As illustrated in FIGS. 10A to 10D, holding recesses 303b, which are provided on the holding member 303, respectively engage with holding projections 301c of the vibrator 300. The holding member 303 holds the vibrator 300 in such a manner that a holding surface 303c and the holding recesses 303b sandwich the vibrator 300 and the buffering member 306.

As illustrated in FIGS. 11A to 11C, also in the third embodiment, a friction member 304 and a cover member 311 are each fixed to a base member 310 with a plurality of screws 315, like in the first embodiment. The pressurizing member 307 serves as a compression spring and acts on the movable member 305, thereby allowing the vibrator 300 to be pressed against the friction member 304 through a pressurizing plate 312 and the buffering member 306. When the pressurizing member 307 presses the vibrator 300 through the buffering member 306, advantageous effects such as dispersion and adjustment of the pressurizing force applied from the pressurizing plate 312 and suppression of attenuation of the high-frequency vibration generated on the vibrator 300 can be obtained.

Like in the first embodiment and the second embodiment, rollers 309 are provided between a side wall of the movable member 305 and an inside wall of the holding member 303, and the rollers 309 are each configured to be able to roll between the side wall of the movable member 305 and the inside wall of the holding member 303. Further, the relative movement of the movable member 305 and the holding member 303 in the X-direction is regulated, thereby allowing the vibrator 300 to be moved relatively to the friction member 304. In this case, the movable member 305 can be moved relatively to the friction member 304 integrally with the vibrator 300 and the holding member 303 with no backlash.

A rolling mechanism for reducing a sliding load between the movable member 305 and the cover member 311 during the relative movement is similar to that of the first and second embodiments. The pressurizing member 307 acts on an operating surface 305b of the movable member 305, thereby allowing the movable member 305 to be pressed against the cover member 311 through a rolling member 308, like in the first and second embodiments.

Among three pairs of a rolling groove part 311a and a rolling groove part 305a that are opposed to each other, two pairs of the rolling groove part 305a and the rolling groove part 311a are recesses having a V-shaped slope. The rolling member 308 is sandwiched between two pairs of V-shaped recesses, thereby allowing the movable member 305 to be guided to advance straight in the relative movement direction with no backlash in the orthogonal direction (Y-direction). The friction member 304 and the pressurizing member 307 respectively correspond to a friction member and a pressurizing member according to the present invention.

The holding member 303 is provided with holding arm parts 303a, and the holding surface 303c and the holding arm parts 303a sandwich the vibrator 300 and the buffering member 306, thereby holding the vibrator 300. As illustrated in FIGS. 11A to 11C, the pressurizing plate 312 is fitted into an opening 303e which is provided in the holding member 303, thereby achieving the structure with no backlash in the relative movement direction. The pressurizing member 307 acts on an operating surface 312a of the pressurizing plate 312, thereby allowing the pressurizing surface 312b to pressurize the vibrator 300 through the buffering member 306.

In FIGS. 12A and 12B, the pressurizing force $F_{1a}$ indicates a pressurizing force for pressing the vibrator 300 against the friction member 304, and the pressurizing force $F_{1b}$ indicates a pressurizing force for pressing the pressurizing plate 312 against the buffering member 306. The pressurizing force $F_{1b}$ is illustrated at a position deviating from the center of the vibrator 300 in each of the X-direction and the Y-direction. However, in the actual structure, the pressurizing force is applied at the center of the vibrator 300.

The pressurizing force $F_{1b}$ is applied to the vibrator 300 from the pressurizing plate 312 that is fitted into the opening 303e provided at the center of the holding member 303. Accordingly, the position where the pressurizing plate 312 applies the pressurizing force $F_{1b}$ to the buffering member 306 is the center of the vibrator 300.

In the third embodiment, the holding projections 301c provided on the vibrator 300 are held, which eliminates the need for providing the holding unit in the relative movement direction, like in the first embodiment. Accordingly, a relational expression $L_3<L_0$ (see FIG. 10A and FIG. 14B) holds. Thus, in the third embodiment, the length of the vibrator in the relative movement direction can be reduced and miniaturization can be achieved.

Therefore, since the holding member 303 holds and sandwiches the holding projections 301c provided on the vibrator 300, the miniaturization of the vibrator 300 in the relative movement direction can be achieved.

In the second embodiment, the pressurizing force $F_{1b}$ generated by the pressurizing member 207 acts on the buffering member 206 at two locations on the pressurizing surface 212b. On the other hand, in the third embodiment, the pressurizing plate 312 and the pressurizing surface 312b are provided at the center, so that the pressurizing force generated by the pressurizing member 307 acts at the center of each of the buffering member 306 and the vibrator 300. Accordingly, in the third embodiment, the miniaturization of the vibrator 300 in the relative movement direction, as well as an advantageous effect that variations in the pressurizing force on two protrusions 301a can be reduced and thus the vibrator can be stably pressed can be achieved.

(Fourth Embodiment)

A fourth embodiment of the present invention will be described below. The second embodiment illustrates an example in which the vibrator 200 is held in such a manner that the vibrator 200 and the buffering member 206 are sandwiched between L-shaped holding arm parts 203a and the holding recesses 203b of the holding member 203. The fourth embodiment differs from the second embodiment in that a vibrator 400 is held using a plate-shaped holding plate 413 and spherical holding balls 414. Descriptions of components of the fourth embodiment that are the same as those of the second embodiment are omitted, and only components of the fourth embodiment that are different from those of the second embodiment will be described.

FIGS. 13A to 13D are diagrams each illustrating the vibrator 400 and a method for holding the vibrator 400 according to the fourth embodiment, and correspond to FIGS. 3A to 3D, respectively.

An elastic body 401 is provided with two holding recesses 401d each having a circular hole shape. A holding member 403 includes the holding plate 413, the holding balls 414, and a holding base 415. Two holding holes 413a and 413b are provided at positions respectively opposed to the holding recesses 401d on the holding plate 413. The holding holes 413a each have a circular hole shape, and the holding holes 413b each have an elongate hole shape elongated in the orthogonal direction.

Among the holding recesses 401d and the holding holes 413a and 413b, the holding hole 413b has a groove shape elongated in the direction orthogonal to the relative movement direction, and the holding recesses 401d and the holding hole 413a have a circular hole shape. The spherical holding balls 414 are provided so as to be fitted between the holding holes 413a and 413b and the holding recesses 401d. The holding plate 413 is fixed to the holding base 415 by bonding or welding, thereby sandwiching a buffering member 406, the vibrator 400, and the holding balls 414. The holding member 403 sandwiches the vibrator 400 and the buffering member 406.

The holding member 403 includes the holding plate 413 and the holding balls 414. The holding balls 414 respectively engage with the holding recesses 401d provided on the vibrator 400 and with the holding holes 413a and 413b provided on the holding plate 413, thereby regulating the vibrator 400 from moving in the relative movement direction relative to the holding member 403 and holding the vibrator with no backlash. The holding plate 413, the holding ball 414, the holding recess 401d, and the holding holes 413a and 413b respectively correspond to a holding plate, a spherical member, a first holding recess, and a second holding recess according to the present invention.

In the fourth embodiment, the vibrator 400 and the buffering member 406 are sandwiched and held by the holding member 403, which eliminates the need for providing the holding unit in the relative movement direction. Accordingly, a relational expression $L_4<L_0$ (see FIG. 14B) holds. Thus, in the fourth embodiment, the length of the vibrator in the relative movement direction can be reduced and miniaturization can be achieved. Therefore, in the fourth embodiment, the holding balls 414 engage with the holding recesses 401d provided on the vibrator 400 and with the holding holes 413a and 413b provided on the holding plate 413, and the vibrator 400 is sandwiched and held by the holding member 403, thereby achieving the miniaturization of the vibrator 400 in the relative movement direction.

In the second embodiment, the vibrator 200 is held in such a manner that the vibrator 200 and the buffering member 206 are sandwiched between the L-shaped holding arm parts 203a and the holding recesses 203b which are provided on the holding member 203. On the other hand, in the fourth embodiment, the holding member 403 is divided into a plurality of members. For example, in a state where the buffering member 406, the vibrator 400, and the holding balls 414 are placed on the holding base 415, the holding plate 413 is fixed to the holding base 415 in such a manner that the holding holes 413a and 413b finally engage with the holding balls 414. Accordingly, in the fourth embodiment, the miniaturization of the vibrator 400 in the relative movement direction, as well as an advantageous effect that the holding member 403 includes two components, i.e., the holding plate 413 and the holding base 415, resulting in an improvement in assembly performance can be achieved. Further, the vibrator 400 can be stably held by the rigidity of the holding plate 413.

In the fourth embodiment, the example in which the holding balls 414 engage with the holding recesses 401d provided on the vibrator 400 and with the holding holes 413a and 413b provided on the holding plate 413 is described. However, a projection may be provided on one of the vibrator 400 and the holding plate 413 and the projection may engage with a recess provided on the other one of the vibrator 400 and the holding plate 413. With this structure, the need for providing the holding balls 414 is eliminated, resulting in a reduction in the number of components.

Exemplary embodiments of the present invention have been described above. The present invention is not limited to the embodiments and can be modified or altered in various ways within the gist of the invention. For example, the vibration wave motor may be an ultrasonic motor in which a vibrator ultrasonically vibrates.

The present invention is applicable to electronic devices, especially, lens driving apparatuses, which are required to achieve a reduction in size and have a wide driving speed range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-124267, filed Jun. 23, 2016, which is hereby incorporated by reference herein in its entirety.

What is claimed is:

1. A vibration wave motor comprising:
a vibrator;
a pressing member configured to press the vibrator against a friction member;
a holding member configured to hold the vibrator; and
a buffering member provided between the vibrator and the holding member,
wherein the vibrator and the friction member are moved relatively to each other in a relative movement direction by vibration of the vibrator,
wherein the holding member includes an extending part extending in a pressing direction of the pressing member and holds the vibrator in such a manner that the holding member sandwiches the vibrator and the buffering member with the extending part,
wherein the vibrator is provided with one of a holding projection and a holding recess having a concave shape, and the extending part is provided with the other one of the holding projection and the holding recess, and the holding projection and the holding recess engage with each other to regulate and hold movement of the vibrator in the relative movement direction relative to the holding member, and
wherein the one of the holding projection and the holding recess provided on the vibrator is provided at an intersection between nodes of two natural vibration modes generated in the vibrator.

2. The vibration wave motor according to claim 1, wherein the buffering member is fixed to one of the vibrator and the holding member.

3. The vibration wave motor according to claim 1, wherein the holding projection has a spherical shape and the holding recess is a V-shaped groove extending in a direction orthogonal to the relative movement direction.

4. The vibration wave motor according to claim 1, wherein the holding member includes a holding plate and a spherical member, and the spherical member engages with each of a first holding recess and a second holding recess to regulate movement of the vibrator in the relative movement direction relative to the holding member, a first holding recess being provided on the vibrator, and a second holding recess being provided at a position opposed to the first holding recess of the holding plate.

5. The vibration wave motor according to claim 4, wherein
at least two first holding recesses and at least two second holding recesses are provided, and
one of the first holding recesses and the second holding recesses has a groove shape elongated in a direction orthogonal to the relative movement direction, and the other one of the first holding recesses and the second holding recesses has a circular hole shape.

6. The vibration wave motor according to claim 1, wherein a holding reaction force generated along with a pressing force generated by the pressing member and a holding force for the holding member to hold the vibrator are applied to the buffering member, and the pressing force and the holding reaction force are applied to different positions of the buffering member.

7. The vibration wave motor according to claim 6, wherein a position where the pressing force is applied to the buffering member is a center of the vibrator.

8. The vibration wave motor according to claim 1,
wherein the vibrator is in contact with the friction member at a first protrusion and a second protrusion, and
wherein the one of the holding projection and the holding recess provided on the vibrator is provided at a position between the first protrusion and the second protrusion in the relative movement direction.

9. The vibration wave motor according to claim 1,
wherein the vibrator is in contact with the friction member at a first protrusion and a second protrusion, and
wherein the one of the holding projection and the holding recess provided on the vibrator is provided at a position outside of the first protrusion and the second protrusion in a direction orthogonal to the relative movement direction.

10. The vibration wave motor according to claim 1, wherein the vibration wave motor is an ultrasonic motor in which the vibrator ultrasonically vibrates.

11. The vibration wave motor according to claim 1, wherein when the vibrator and the friction member are moved relatively to each other, the holding member and the friction member are moved relatively to each other.

12. The vibration wave motor according to claim 1, wherein the buffering member comes into contact with the vibrator.

13. A lens driving apparatus comprising:
a vibration wave motor including:
a vibrator;
a pressing member configured to press the vibrator against a friction member;
a holding member configured to hold the vibrator; and
a buffering member provided between the vibrator and the holding member; and
a lens,
wherein the vibrator and the friction member are moved relatively to each other in a relative movement direction by vibration of the vibrator,
wherein the holding member includes an extending part extending in a pressing direction of the pressing member and holds the vibrator in such a manner that the holding member sandwiches the vibrator and the buffering member with the extending part,
wherein the vibrator is provided with one of a holding projection and a holding recess having a concave shape, and the extending part is provided with the other one of the holding projection and the holding recess, and the holding projection and the holding recess engage with each other to regulate and hold movement of the vibrator in the relative movement direction relative to the holding member,
wherein the one of the holding projection and the holding recess provided on the vibrator is provided at an intersection between nodes of two natural vibration modes generated in the vibrator, and wherein the lens is driven by the relative movement in an optical axis direction.

* * * * *